US007936864B2

(12) United States Patent
Kanada

(10) Patent No.: US 7,936,864 B2
(45) Date of Patent: May 3, 2011

(54) VOICE COMMUNICATION TERMINAL, MEDIA SERVER, AND METHOD FOR CONTROL OF LOCKING VOICE COMMUNICATION

(75) Inventor: Yasusi Kanada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1246 days.

(21) Appl. No.: 11/487,311

(22) Filed: Jul. 17, 2006

(65) Prior Publication Data

US 2007/0071180 A1   Mar. 29, 2007

(30) Foreign Application Priority Data

Sep. 5, 2005   (JP) ................. 2005-256494

(51) Int. Cl.
*H04M 3/42* (2006.01)
(52) U.S. Cl. ............. 379/201.1; 379/201.6; 379/202.01; 379/204.01
(58) Field of Classification Search .................. 379/242; 709/231, 226; 348/14.08
See application file for complete search history.

(56) References Cited

U.S. PATENT DOCUMENTS

| 6,597,667 | B1 | 7/2003 | Cerna |
| 7,406,167 | B2 * | 7/2008 | Ooki ............................. 379/242 |
| 2004/0073676 | A1 * | 4/2004 | Honma et al. ................ 709/226 |
| 2004/0179092 | A1 * | 9/2004 | LaPoint ..................... 348/14.08 |
| 2007/0186002 | A1 * | 8/2007 | Campbell et al. ............. 709/231 |

FOREIGN PATENT DOCUMENTS

| JP | 04-054788 | 2/1992 |
| JP | 07-038870 | 2/1995 |
| JP | 11-088513 | 3/1999 |
| JP | 2000-152206 | 5/2000 |
| JP | 2003-510861 | 3/2003 |
| JP | 2003-101663 | 4/2003 |
| WO | WO-97/42559 | 11/1997 |

OTHER PUBLICATIONS

"Adjusting the Display Appearance", Customizing the Desktop, Taskbar and Start Menu, p. 264, Jul. 17, 2006.
"Adjusting the Display Appearance," Customizing the Desktop, Taskbar and Start Menu, "Windows XP Home Edition Complete," by Dave Evans, Greg Jacobe, Hollis Thomases, Mari Smith and Chris Treadaway, published by Sybex Inc., Nov. 2001, p. -264.
Japanese Patent Office, Notification of Reasons for Refusal for Japanese Application No. 2005-256494 dated Aug. 24, 2010.
Japanese Patent Office Notice of Rejection, dated Mar. 30, 2010.

* cited by examiner

*Primary Examiner* — Curtis Kuntz
*Assistant Examiner* — Joseph J Nguyen
(74) *Attorney, Agent, or Firm* — Stites & Harbison, PLLC; Juan Carlos A. Marquez, Esq.

(57) ABSTRACT

A lock control technique suitable for voice communication terminals. A voice communication terminal includes an unattended state detecting unit which detects an unattended state of the terminal, when its user leaves the terminal, and a lock control unit. The lock control unit determines whether the unattended state detected by the unattended state detecting unit has continued for a given time period or longer. If determining that the unattended state has continued for the given time period or longer, the lock control unit controls the terminal's communication so that voice input to the terminal will not be transmitted to other parties in conversation and voice of any other party will not be output from the computer.

13 Claims, 14 Drawing Sheets

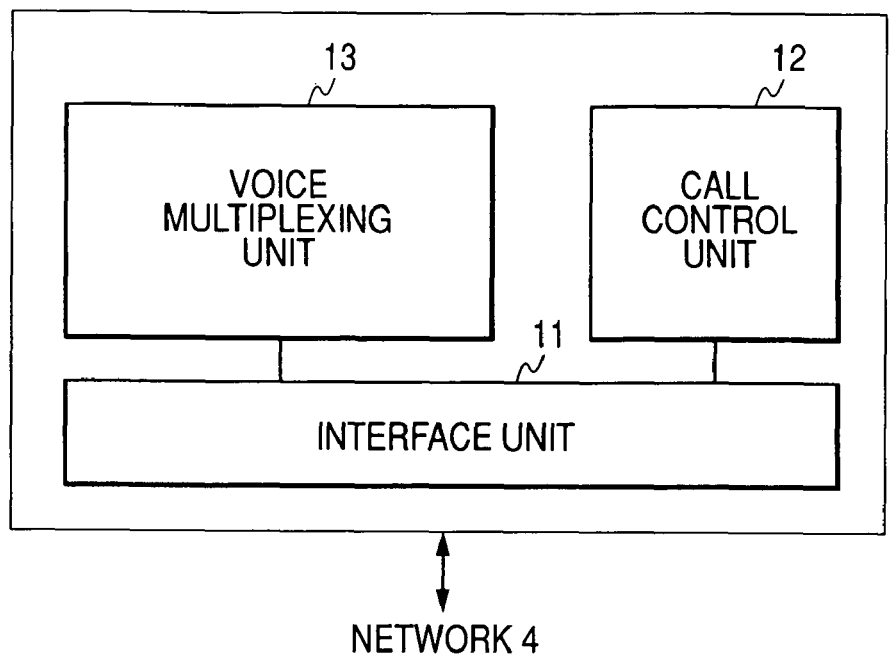
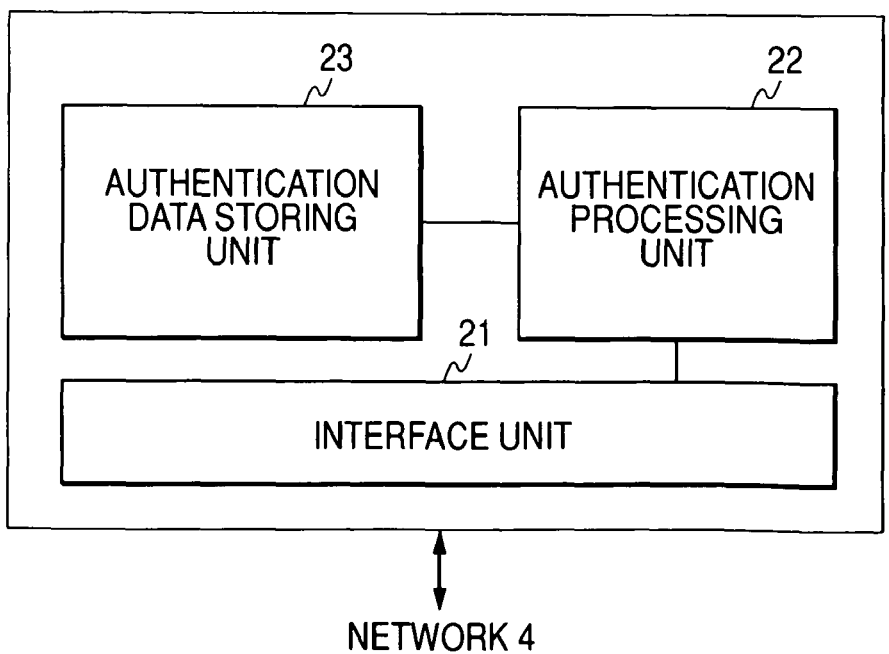

FIG. 4

AUTHENTICATION DATA STORING UNIT 23

| TERMINAL ID (231) | AUTHENTICATION DATA (PASSWORD) (232) |
|---|---|
| 001 | ******** |
| 002 | ******** |
| ⋮ | ⋮ |

230

HEADSET 36

LOCK CONTROL S103

UNLOCK CONTROL S108

MEDIA SERVER 1A

LOCK CONTROL UNIT 14

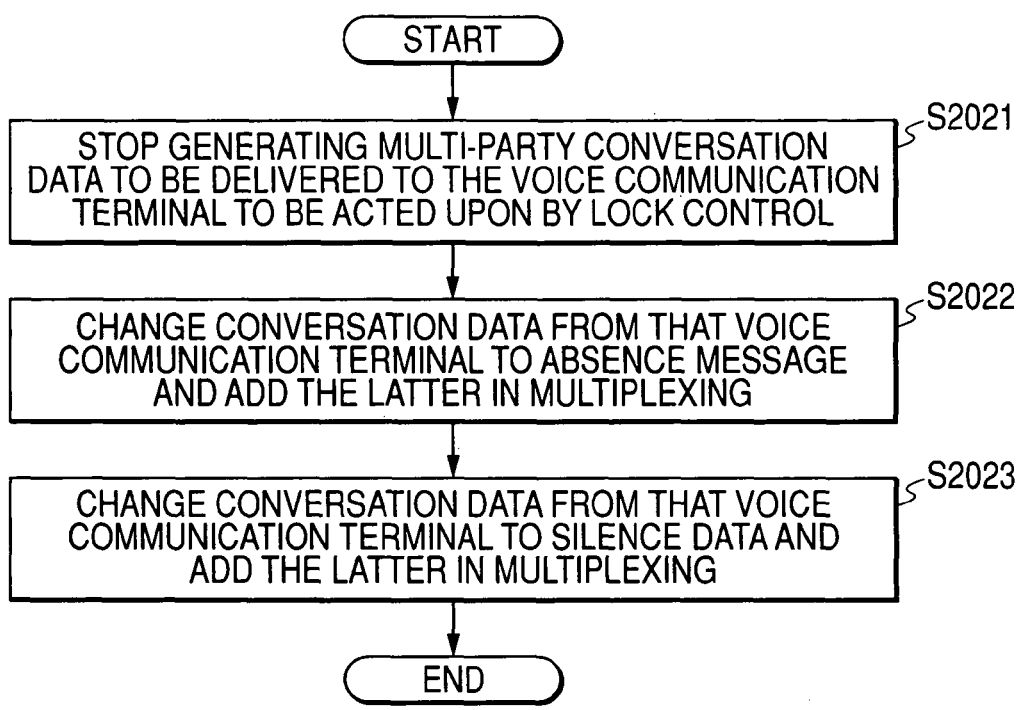
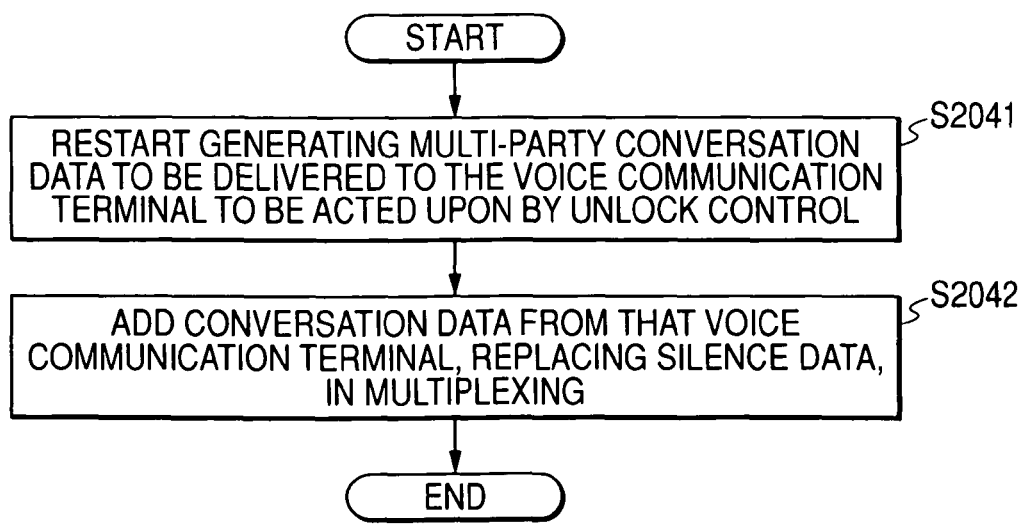

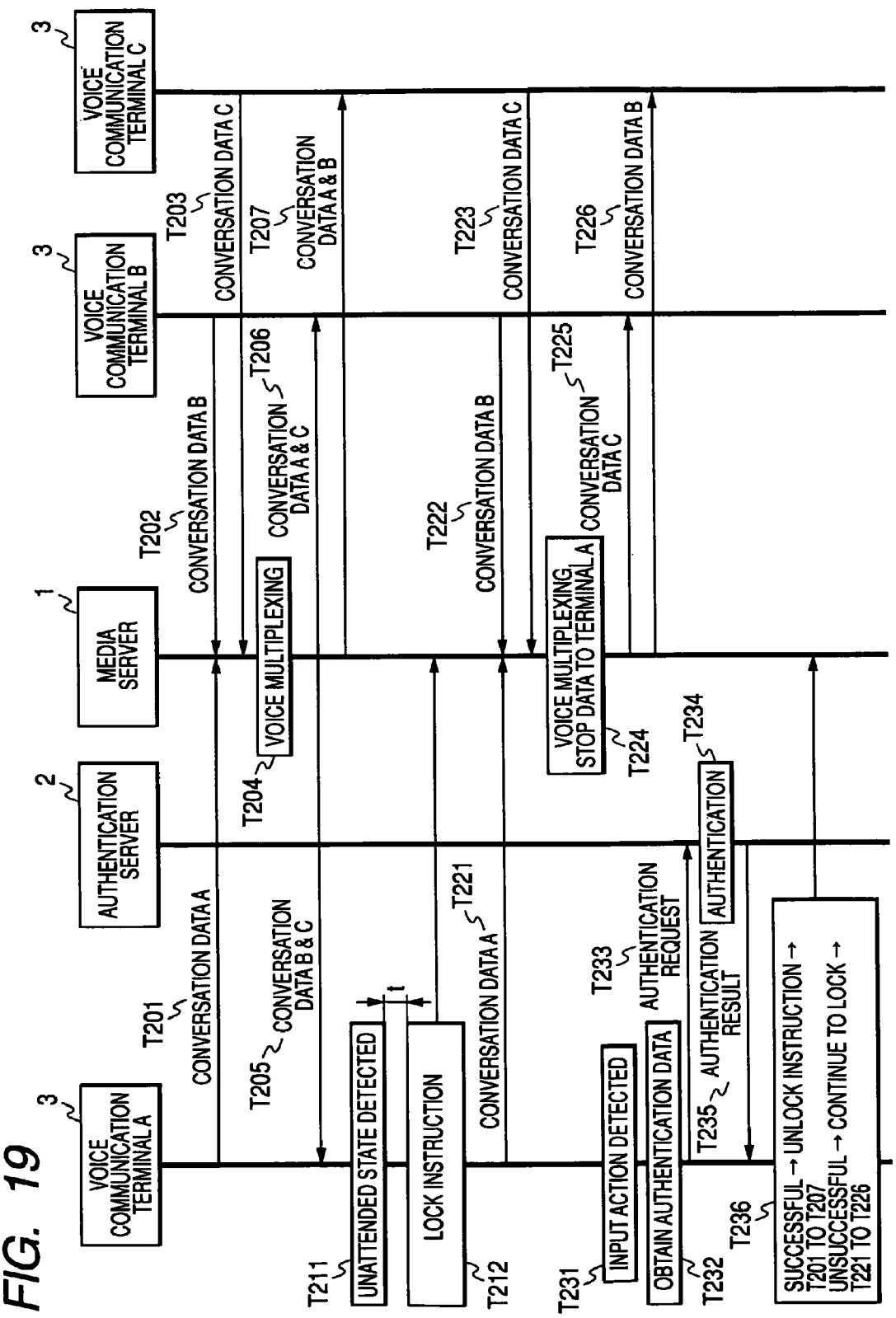

VOICE COMMUNICATION TERMINAL, MEDIA SERVER, AND METHOD FOR CONTROL OF LOCKING VOICE COMMUNICATION

CLAIM OF PRIORITY

The present application claims priority from Japanese application JP 2005-256494 filed on Sep. 5, 2005, the content of which is hereby incorporated by reference into this application.

FIELD OF THE INVENTION

The present invention relates to a lock control technique for voice communication terminals.

BACKGROUND OF THE INVENTION

Operating systems (OS) such as Microsoft Windows XP (a registered trademark) are provided with a password-protected screen saver. For a computer in which this kind of OS has been installed, the screen saver is activated to lock the computer, if no key-in or cursor action has been done for a certain period. After the computer is locked, before accepting a new key-in or cursor action attempted by its user, the computer prompts the user to enter a password. Only if the user has entered a valid password, the computer is unlocked (Windows XP Home Edition COMPLETE, pages 263-264, published by SYBEX Inc.). Thereby, the computer is protected from malicious access.

SUMMARY OF THE INVENTION

Password-protected screen savers of prior art take no consideration of voice communication. When one performs voice communication using a computer connecting to the other party's machine, there might occur a case where the other party is talking to you one-sidedly, while you do not perform key-in or cursor action for a certain period. In such case, the screen saver is activated and locks the input devices such as a keyboard and a mouse and the display screen of the computer. That is, your computer is locked, even while you are engaged in voice communication. To unlock, you have to enter your password, which may be bothersome in this situation. Because the locking does not lock voice input and output, there is a danger that the other party's speaking as you want it secrete is heard by someone else when you are off your machine during voice communication.

The present invention has been made in view of the above circumstances and an object of the invention is to provide a lock control technique suitable for voice communication terminals.

To solve the above problem, in the present invention, a voice communication terminal is equipped with a sensor for detecting an unattended state of the terminal, when its user leaves the terminal. If the unattended state detected by the sensor has continued for a given time period or longer, lock control is activated to lock voice communication with other parties in conversation.

By way of example, a voice communication terminal of the present invention includes a detecting unit that detects an unattended state of the voice communication terminal, when its user leaves the terminal; a determining unit that determines whether the unattended state detected by the detecting unit has continued for a given time period or longer; and a lock control unit that locks the terminal's communication function so that voice input to the terminal will not be transmitted to other parties in conversation and voice of any other party will not be output from the terminal, if the unattended state has continued for the given time period or longer, as determined by the determining unit.

In the present invention, when the user leaves the voice communication terminal, the unattended state is detected and the lock control is activated to lock voice communication with other parties in conversation, if the unattended state has continued for a given time period or longer. Thus, it is possible to prevent an event where the voice communication terminal is locked in the middle of voice communication. It is therefore possible to provide a lock control technique suitable for voice communication terminals.

BRIEF DESCRIPTION OF THE DRAWINGS

FIG. 2 is a simplified structural diagram of a media server 1;

FIG. 3 is a simplified structural diagram of an authentication server 2;

FIG. 4 illustrates an exemplary structure of an authentication data storing unit 23;

FIG. 16 is a flow diagram to explain an operation flow of lock control (S202) in FIG. 15;

FIG. 17 is a flow diagram to explain an operation flow of unlock control (S204) in FIG. 15;

FIG. 19 illustrates a schematic operation of a multi-party call system to which the second embodiment of the present invention is applied.

DETAILED DESCRIPTION OF THE PREFERRED EMBODIMENTS

Some illustrative embodiments of the present invention will now be described.

First Embodiment

Figure 1:
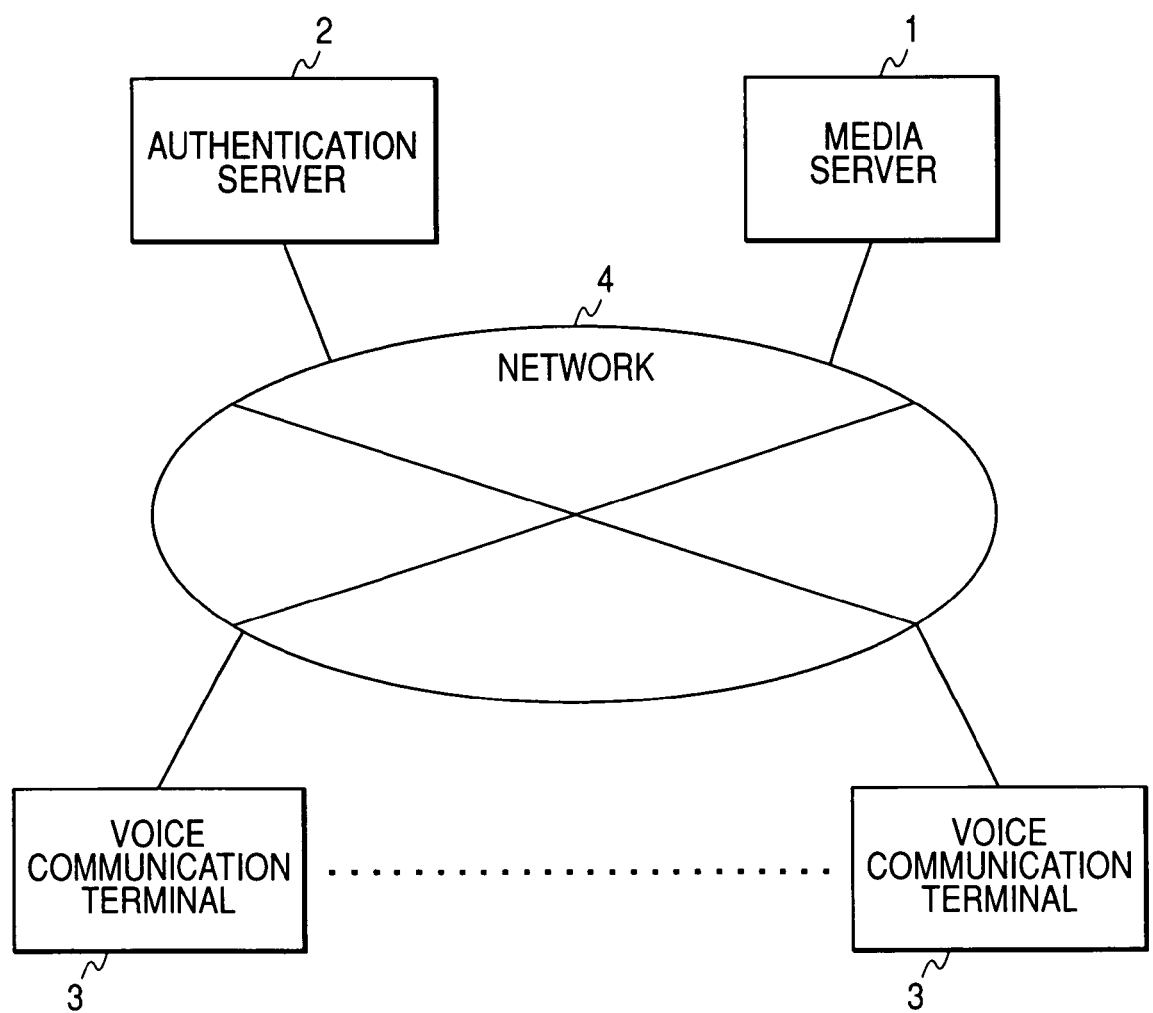
FIG. 1 is a schematic diagram of a multi-party call system to which a first embodiment of the present invention is applied.

FIG. 1 is a schematic structural diagram of a multi-party call system to which a first embodiment of the present invention is applied. As shown, the multi-party call system of the first embodiment is comprised of a media server 1, an authentication server 2, and a plurality of voice communication terminals 3 which are all interconnected via a network 4 which is a LAN, WAN, etc.

The media server 1 conducts multi-party sessions among the plurality of voice communication terminals 3. FIG. 2 is a simplified structural diagram of the media server 1. As shown, the media server 1 includes an interface unit 11 for connecting to the network 4, a call control unit 12, and a voice multiplexing unit 13.

The call control unit 12 establishes a call path between the media server and each voice communication terminal 3 in accordance with a call control protocol such as Session Initiation Protocol (SIP) and H323.

The voice multiplexing unit 13 extracts conversation data from voice packets (e.g., Real-time Transport Protocol (RTP) packets) received from voice communication terminals 3 other than the i-th one (where $1 \leq i \leq n$) through the call paths established between the media server and each of these voice communication terminals, and combines the conversation data from each terminal into multi-party conversation data to be delivered to the i-th voice communication terminal 3. Then, the voice multiplexing unit 13 puts the thus multiplexed multi-party conversation data into voice packets and outputs the voice packets to the i-th voice communication terminal 3 through the call path established between the media server and the i-th voice communication terminal 3. The voice multiplexing unit 13 performs this processing for all destination voice communication terminals 3.

The authentication server 2 performs user authentication of each voice communication terminal 3. FIG. 3 is a simplified structural diagram of the authentication server 2. As shown, the authentication server 2 includes an interface unit 21 for connecting to the network 4, an authentication processing unit 22, and an authentication data storing unit 23.

Figure 4:
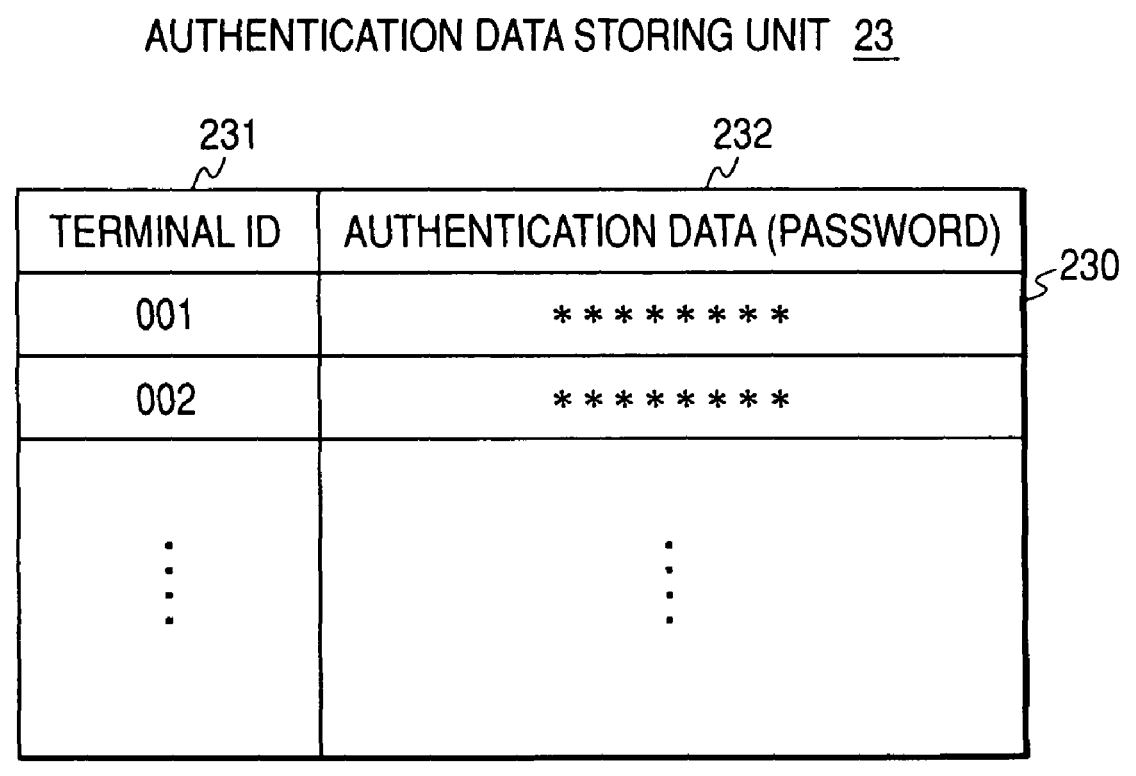

In the authentication data storing unit 23, authentication data for the users of the voice communication terminals 3 is registered. FIG. 4 illustrates an exemplary structure of the user authentication data storing unit 23. As shown, records 230 per voice communication terminal 3 are registered. Each record 230 consists of a field 231 for registering the ID (e.g., MAC address) of a voice communication terminal and a field 232 for registering the terminal's user authentication data (e.g., password).

When the authentication processing unit 22 receives a user authentication request from a voice communication terminal 3 through the interface unit 21, it searches the authentication data storing unit 23 for a record 230 having the ID of the voice communication terminal 3 and determines whether there is a match between the authentication data registered in that record 230 and the authentication data included in the user authentication request. If there is a match, the authentication processing unit 22 determines that the authentication is successful; if not, it determines that the authentication is unsuccessful. Then, the authentication processing unit 22 generates a message containing a result of the determination and transmits the message to the voice communication terminal 3 that issued the user authentication request through the interface unit 21.

Figure 5:
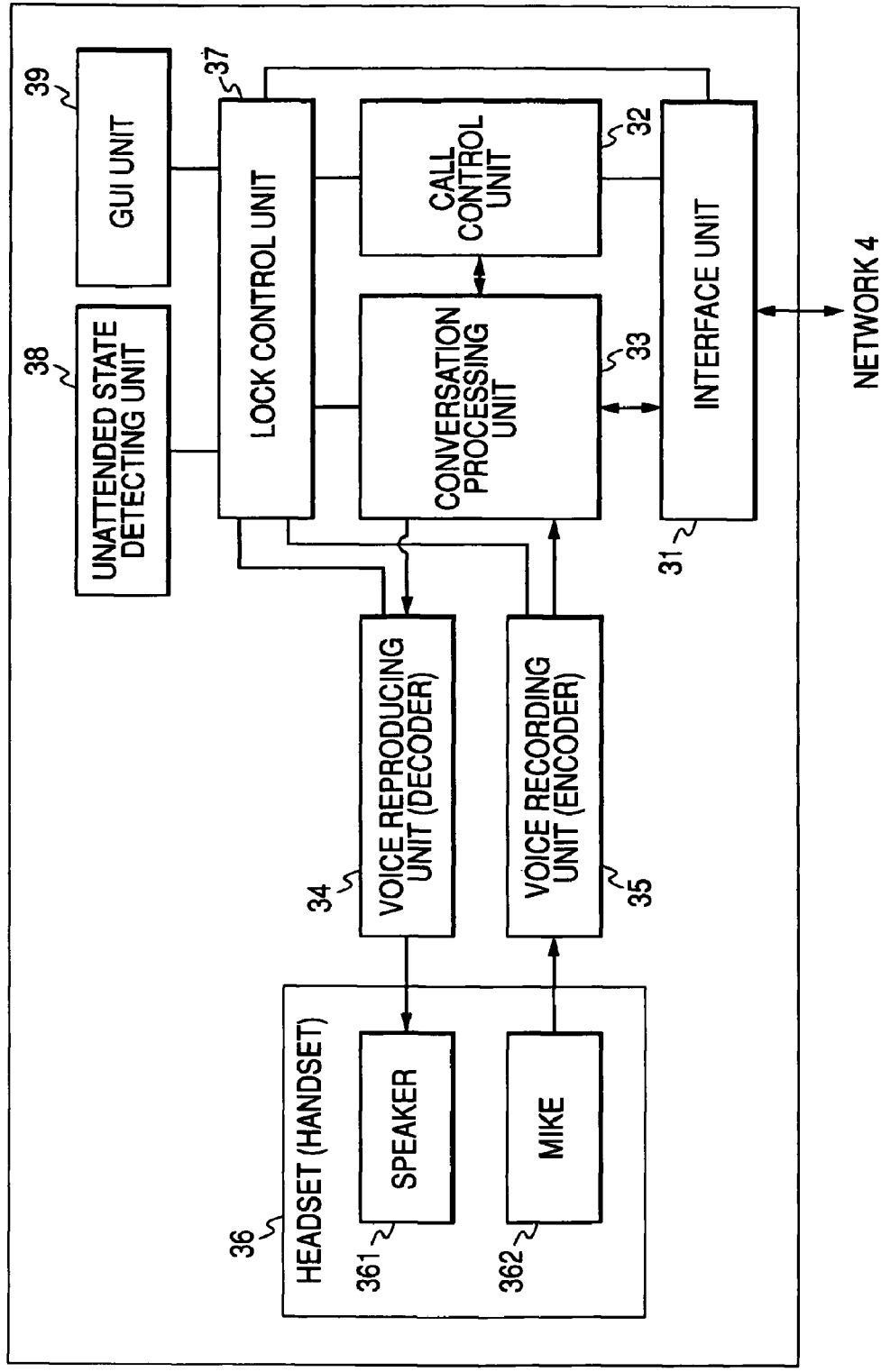
FIG. 5 is a simplified structural diagram of a voice communication terminal 3.

A voice communication terminal 3 performs a multi-party conversation with at least another one voice communication terminal 3 via the media server 1. FIG. 5 is a simplified structural diagram of a voice communication terminal 3. As shown, the voice communication terminal 3 includes an interface unit 31 for connecting to the network 4, a call control unit 32, a conversation processing unit 33, voice reproducing unit (audio decoder) 34, a voice recording unit (audio encoder) 35, a headset (or handset) consisting of a speaker 361 and a mike 362, a lock control unit, an unattended state detecting unit 38, a Graphical User Interface (GUI) unit 39 for accepting user actions via an input/output device.

The call control unit 32 establishes a call path between the voice communication terminal 3 and the media server 1 in accordance with a call control protocol such as SIP and H323.

The conversation processing unit 33 extracts multi-party conversation data from voice packets (e.g., RTP packets) received from the media server 1 through the call path established between the voice communication terminal 3 and the media server 1 outputs that data to the voice reproducing unit 34. Also, the conversation processing unit 33 puts conversation data output from the voice recording unit 35 into voice packets and transmits the voice packets through the call path to the media server 1.

The voice reproducing unit 34 decodes the multi-party conversation data output from the conversation processing unit 33 into analog voice reproduction signals and outputs the voice reproduction signals from the speaker 361 of the headset (or handset) 36.

The voice recording unit 35 encodes voice signals picked up by the mike 362 of the headset (or handset) 36 into digital conversation data and outputs the conversation data to the conversation processing unit 33.

The unattended state detecting unit 38 detects whether the voice communication terminal 28 has become unattended, when its user leaves the terminal. Various concrete examples of the unattended state detecting unit 38 can be contemplated. These examples of the unattended state detecting unit 38 will be described below.

Figure 6:
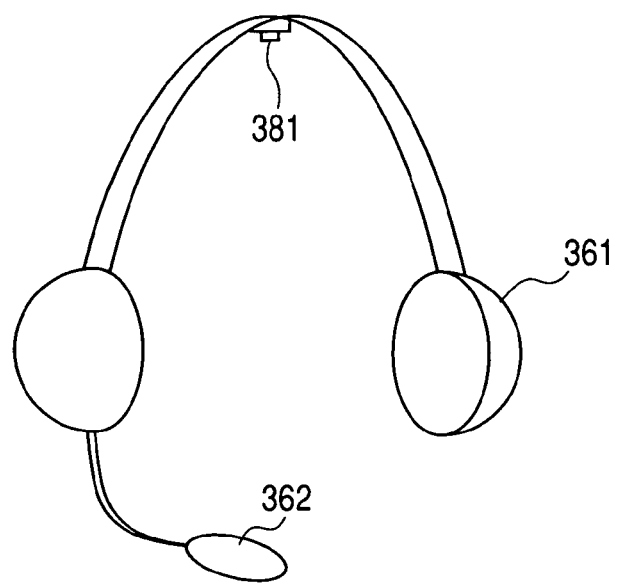
FIG. 6 illustrates a first example of an unattended state detecting unit 38.

FIG. 6 illustrates a first example of the unattended state detecting unit 38. In this example, the headset 36 is equipped with a wearing sensor 381 by which an unattended state of the voice communication terminal 3, when the user leaves, is detected. When the user wears the headset 36, the wearing sensor 381 is pressed and a detection signal is output from the wearing sensor 381. When the user removes the headset 36, the wearing sensor 381 is released from the pressed state and the detection signal being output from the wearing sensor 381 stops. Thus, by monitoring the detection signal output from the wearing sensor 381, it can be detected whether the voice communication terminal 3 is unattended, when the user leaves the terminal.

Figure 7:
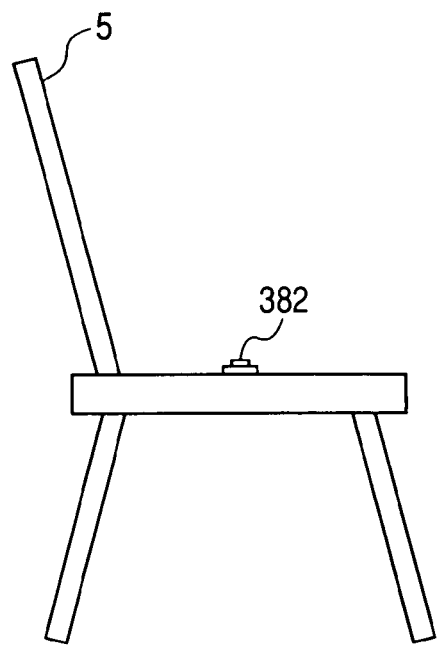
FIG. 7 illustrates a second example of the unattended state detecting unit 38.

FIG. 7 illustrates a second example of the unattended state detecting unit 38. In this example, a chair 5 for operating the voice communication terminal 3 is equipped with a seating sensor 382 by which an unattended state of the voice communication terminal 3, when the user leaves, is detected. When the user sits on the chair 5, the seating sensor 382 is pressed and a detection signal is output from the seating sensor 382. When the user stands up from the chair 5, the seating sensor 382 is released from the pressed state and the detection signal being output from the seating sensor 382 stops. Thus, by monitoring the detection signal output from the seating sensor 382, it can be detected whether the voice communication terminal 3 is unattended, when the user leaves the terminal.

Figure 8:
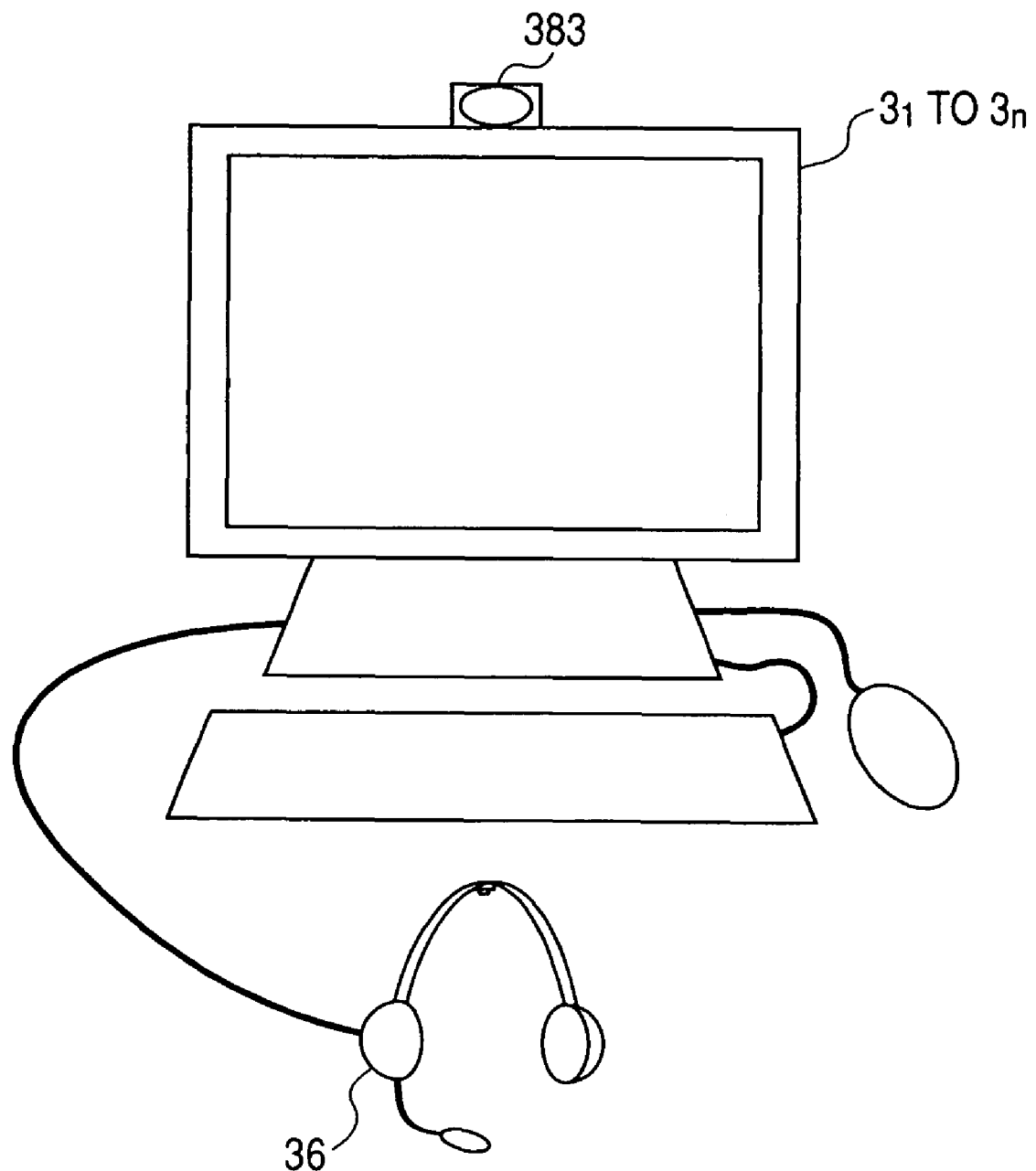
FIG. 8 illustrates a third example of the unattended state detecting unit 38.

FIG. 8 illustrates a third example of the unattended state detecting unit 38. In this example, the voice communication terminal 3 is equipped with an infrared sensor 383 by which an unattended state of the voice communication terminal 3, when the user leaves, is detected. When the user comes close to the voice communication terminal 3, the infrared sensor 383 detects the user and outputs a detection signal. When the user goes away from the voice communication terminal 3, the infrared sensor 383 becomes unable to detect the user and stops the output of the detection signal. Thus, by monitoring the detection signal output from the infrared sensor 383, it can be detected whether the voice communication terminal 3 is unattended, when the user leaves the terminal.

If the unattended state in which the user leaves the voice communication terminal 3 being detected by unattended state detecting unit 38 has continued for a given time period or longer, the lock control unit 37 locks the voice communication with other parties.

Figure 9:
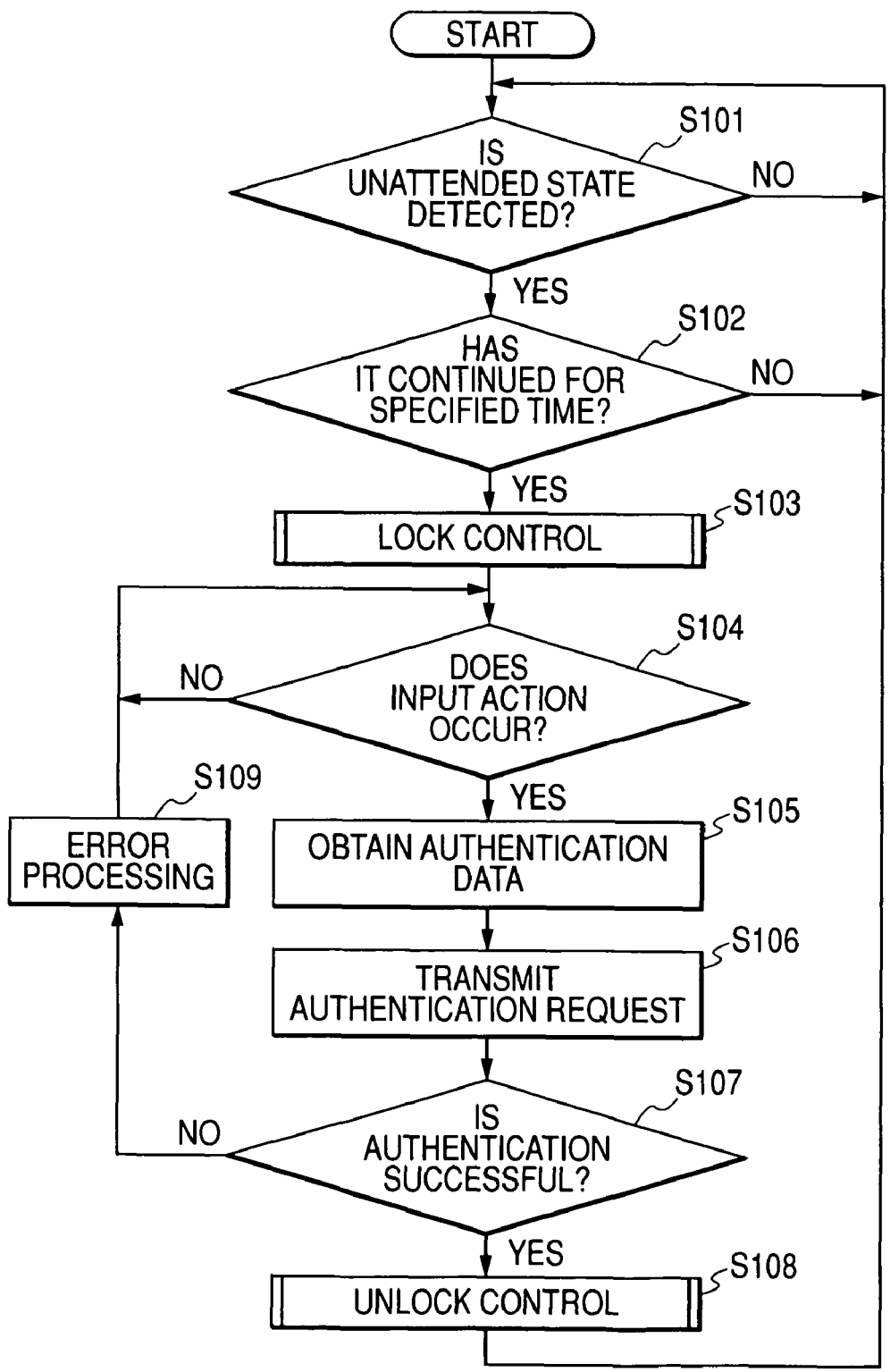
FIG. 9 is a flowchart to explain an operation flow of a lock control unit 37.

FIG. 9 is a flowchart to explain an operation flow of the lock control unit 37 of a voice communication terminal 3. After a call path is established between the terminal and the media server 1 by the call control unit 32, when the conversation processing unit 33 transmits and receives voice packets through this call path, this flow takes place.

First, when an unattended state of the voice communication terminal 3, when the user leaves the terminal, is detected by the unattended state detecting unit 38 (YES at S101), the lock control unit 37 waits until the unattended state has continued for a given time period (e.g., one minute) (S102). If the unattended state has continued for the given time period (YES at S102), the lock control unit 37 performs lock control (S103) which will be described later.

Then, when any input action (key-in, cursor action, etc.) by the user via the GUI unit 39 occurs (YES at S104), the lock control unit 37 has an input prompt screen for authentication data (e.g., password) displayed on the GUI unit 39 and obtains authentication data entered by the user (S105). Then, the lock control unit 37 generates an authentication request including, the obtained authentication data and the ID of the terminal and transmits the authentication request to the authentication server 2 through the interface unit 31 (S106). The lock control unit 37 awaits a return of an authentication result from the authentication server 2.

If the authentication result received from the authentication server 2 is successful (YES at S107), the lock control unit 37 performs unlock control (S108) which will be described later and then returns to S101. Otherwise, if the authentication result received from the authentication server 2 is unsuccessful (NO at S107), the lock control unit 37 performs predetermined error processing (S109) such as presenting an error message to the user via the GUI unit 39, and returns to S104.

Figure 10:
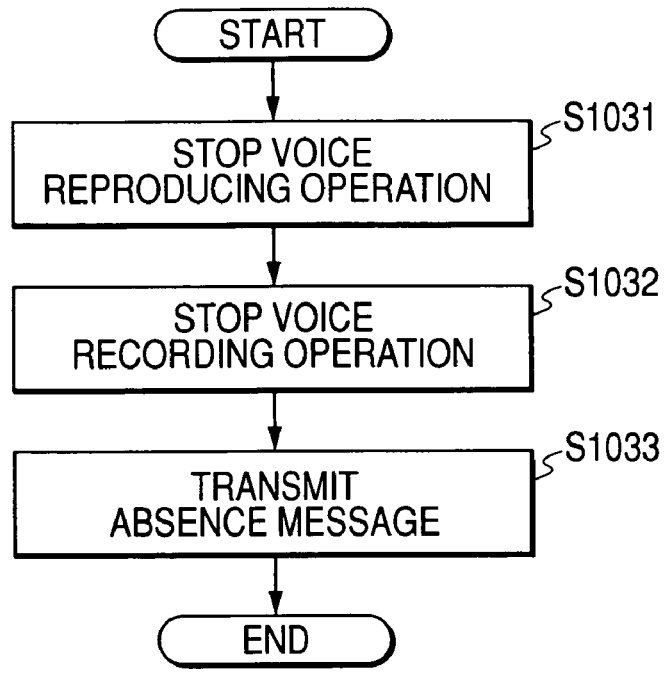
FIG. 10 is a flow diagram to explain an operation flow of lock control (S103) in FIG. 9.

FIG. 10 illustrates an operation flow of the lock control (S103) included in the flowchart shown in FIG. 9.

First, the lock control unit 37 stops the operation of the voice reproducing unit 34 (S1031). This prevents multi-party conversation data received from the media server 1 from being output from the speaker 361 of the headset (or handset) 36. Then, the lock control unit 37 stops th operation of the voice recording unit 35 (S1032). This prevents user's conversation data picked up by the mike 362 of the headset (or handset) 36 from being transmitted to the media server 1. Then, the lock control unit 37 outputs an absence message indicating that the user leaves his or her seat to the conversation processing unit 33. The conversation processing unit 33 outputs a voice packet containing this absence message through the interface unit 31 to the call path which was established between the terminal and the media server 1 by the call control unit 32 (S1033). After the transmission of the absence message, the lock control unit 37 may instruct the call control unit to remove the call path established between the terminal and the media server 1.

Figure 11:
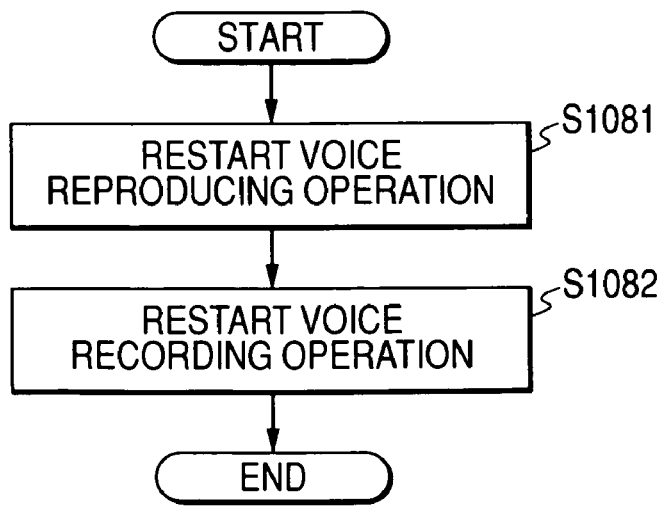
FIG. 11 is a flow diagram to explain an operation flow of unlock control (S108) in FIG. 9.

FIG. 11 illustrates an operation flow of the unlock control (S108) included in the flowchart shown in FIG. 9.

First, the lock control unit 37 restarts the operation of the voice reproducing unit 34 (S1081). By this restart, multi-party conversation data received from the media server 1 is output from the speaker 361 of the headset (or handset) 36. Next, the lock control unit 37 restarts the operation of the voice recording unit 35 (S1082). By this restart, user's conversation data picked up by the mike 362 of the headset (or handset) 36 is transmitted to the media server 1. If the call path between the terminal and the media server 1 has been removed, the lock control unit 37 instructs the call control unit 32 to reestablish a call path between the terminal and the media server 1 before executing the step S1081. After the call path is reestablished, the lock control unit 37 proceeds to the step 1081.

Figure 12:
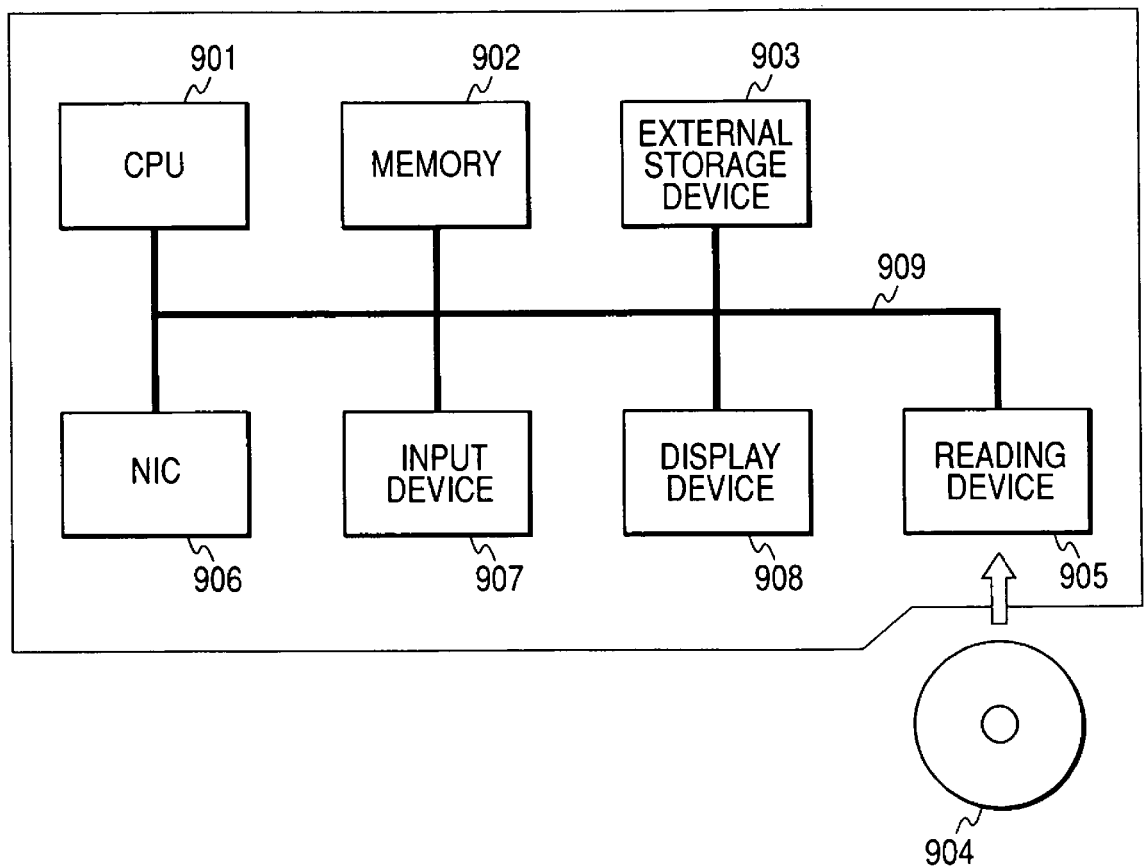
FIG. 12 illustrates a hardware configuration example of the media server 1, authentication server, and vice communication terminal 3.

The authentication server 1, media server 2, and voice communication terminal 3 configured as noted above can be realized by using a common computer system, for example, as shown in FIG. 12, comprising a CPU 901, a memory 902, an external storage device such as HDD, a reading device 905 for reading data from a storage medium 904 such as CD-ROM, DVD-ROM, IC card, etc, an NIC 906 for connecting to the network 4, an input device 907 typically including a keyboard, mouse, etc. (additionally including a mike in the case of a voice communication terminal 3), an output device 908 such as a display (additionally including a speaker in the case of a voice communication terminal 3), and a bus for connecting these components, wherein the CPU 901 executes a program loaded into the memory, thereby implementing the respective functions of the above entities. The above program may be loaded from the storage medium via the reading device 905 or may be downloaded across the network 4 via the NIC 906 into the external storage device 903 from where it may be loaded into the memory 902 and executed by the CPU 901. Alternatively, the program may be directly loaded into the memory 902 without being transferred via the external storage device 903 and executed by the CPU 901.

Figure 13:
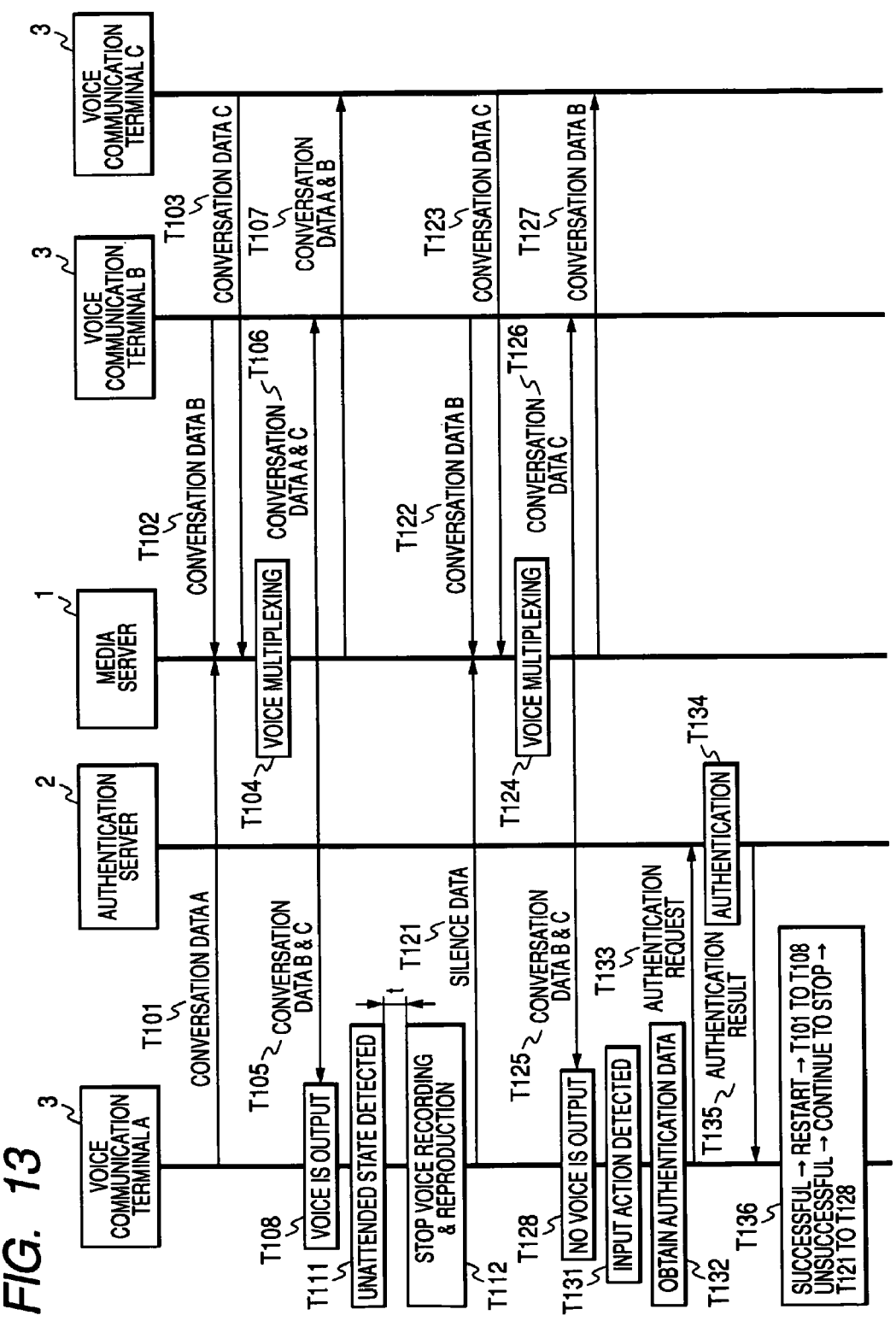
FIG. 13 illustrates a schematic operation of the multi-party call system to which the first embodiment of the present invention is applied.

Next, how the multi-party call system configured as noted above operates is described with reference to FIG. 13. FIG. 13 illustrates an example of the multi-party call system operation in a case where, during a multi-party conversation being performed among three voice communication terminals A to C, the user of a voice communication terminal A leaves his or her seat and returns after a while.

At each of the voice communication terminals A to C, the user's voice is picked up by the mike 362 and encoded into conversation data by the voice recording unit 35. The conversation data is put into voice packets by the conversation processing unit 33 and these packets are transmitted through the interface unit 31 to the media server 1 (T101 to T103).

At the media server 1, the voice packets transmitted from the voice communication terminals A to C are received through the interface unit 11 and passed to the voice multiplexing unit 13. The voice multiplexing unit 13 generates multi-party conversation data to be delivered to each of the voice communication terminals A to C from the conversation data contained in the voice packets transmitted from the voice communication terminals A to C (T104). Specifically, the voice multiplexing unit 13 combines the respective conversation data from the voice communication terminals B and C into multi-party conversation data, thus generating the multi-party conversation data to be delivered to the voice communication terminal A. The voice multiplexing unit 13 combines the respective conversation data from the voice communication terminals C and A into multi-party conversation data, thus generating the multi-party conversation data to be delivered to the voice communication terminal B. The voice multiplexing unit 13 combines the respective conversation data from the voice communication terminals A and B into multi-party conversation data, thus generating the multi-party conversation data to be delivered to the voice communication terminal C. Next, the voice multiplexing unit 13 puts the multi-party conversation data to be delivered to each of the voice communication terminals A to C into voice packets and transmits these packets through the interface unit 11 to the voice communication terminals A to C, respectively (T105 to T107).

At the voice communication terminal A, the voice reproducing unit 34 decodes the multi-party conversation data received from the media server 1 via the interface unit 31 and the conversation processing unit 33 into analog voice reproduction signals and outputs the voice reproduction signals from the speaker 361 (T108). The same processing is performed at the voice communication terminals B and C as well.

At the voice communication terminal A, when an unattended state is detected by the unattended state detecting unit 38 (T111), the lock control unit 37 waits until the unattended state has continued for a given time period t and starts the lock control to stop the operations of the voice reproducing unit 34 and the voice recording unit 35 (T112).

Consequently, at the voice communication terminal A, silence data is put into voice packets by the conversation processing unit 33 and the packets are transmitted through the interface unit 31 to the media server 1 (T121) On the other hand, at the voice communication terminals A and C, after a user's voice is picked up by the mike 362 and encoded into conversation data by the voice recording unit 35, the conversation data is put into voice packets by the conversation processing unit and the packets are transmitted through the interface 31 to the media server 1 (T122, T123).

In consequence, the media server 1 combines the respective conversation data from the voice communication terminals B and C into multi-party conversation data to be delivered to the voice communication terminal A, combines the conversation data from the voice communication terminal C and the silence data from the voice communication terminal A into multi-party conversation data to be delivered to the voice communication terminal B, and combines the silence data from the voice communication terminal A and the conversation data from the voice communication terminal B into multi-party conversation data to be delivered to the voice communication terminal C (T124) Next, the voice multiplexing unit 13 puts the multi-party conversation data to be delivered to each of the voice communication terminals A to C into voice packets and transmits these packets through the interface unit 11 to the voice communication terminals A to C, respectively (t125 to T127).

At the voice communication terminals B and C, the voice reproducing unit 34 decodes the multi-party conversation data received from the media server 1 via the interface unit 31 and the conversation processing unit 33 into analog voice reproduction signals and outputs the voice reproduction signals from the speaker 361. Now that conversation data from the voice communication terminal A is the silence data, only the voice signals from the voice communication terminal C are reproduced at the voice communication terminal B and only the voice signals from the voice communication terminal B are reproduced at the voice communication terminal C. On the other hand, at the voice communication terminal A, the voice reproducing unit 34 is off. Therefore, the multi-party conversation data received from the media server 1 is not reproduced (T128).

Then, at the voice communication terminal A, after the GUI unit 39 accepts any user input action (T131), the lock control unit 37 obtains authentication data (e.g., password) entered by the user via the GUI unit 39 (T132). The lock control unit 37 generates an authentication request including the obtained authentication data and transmits the authentication request to the authentication server 2 through the interface unit 31 (T133).

At the authentication server 2, when receiving the authentication request from the voice communication terminal A through the interface unit 21, the authentication processing unit 22 performs authentication processing for the authentication request, referring to the authentication data storing unit 23 (T134). The authentication server 2 transmits a result of the authentication to the voice communication terminal A (T135).

At the voice communication terminal A, the lock control unit 37 receives from the authentication server 2 the authentication result in response to the authentication request that it transmitted to the authentication server 2. If the authentication result is successful, the lock control unit 37 unlocks the lock control and restarts the operations of the voice reproducing unit 34 and the voice recording unit 35. As a result, the state of a sequence of T101 to T108 is recovered. Otherwise, if the authentication result is unsuccessful, the lock control continues, keeping the voice reproducing unit 34 and the voice recording unit 35 off. In consequence, the state of a sequence of T121 to T128 continues (T136).

At T112, the lock control unit 37 of the voice communication terminal A may instruct the call control unit 32 to remove the call path between the terminal and the media server 1. In this case, subsequent conversation data exchange between the media server 1 and the voice communication terminal A at T121, T125 is not performed. Also, in this case, the lock control unit 37 of the voice communication terminal A instructs the call control unit 32 to reestablish a call path between the terminal and the media server 1 at T136, if the authentication result retuned from the authentication server 2 is successful. After the call path is reestablished, the lock control unit 37 restarts the operations of the voice reproducing unit 34 and the voice recording unit 35.

The first embodiment of the present invention has been described above.

In the present embodiment, a voice communication terminal 3 detects that it has become unattended, when the user leaves, and its lock control locks voice communication with other parties in a call, if the unattended state has continued for a given time period or longer. Therefore, it is possible to prevent an event where the voice communication terminal 3 is locked in the middle of voice communication.

While authentication for unlocking is performed by the authentication server 2 in the present embodiment, the voice communication terminal that has obtained authentication data entered may perform authentication by itself. That is, each voice communication terminal 3 is provided with the authentication processing unit 22 and the authentication data storing unit 23 and authentication data required for unlocking the voice communication function of the terminal is stored beforehand into the authentication data storing unit 23. When the lock control unit 37 obtains authentication data entered by the user via the GUI unit 39, it passes the authentication data to the authentication processing unit 22 and the authentication processing unit 22 performs authentication by checking whether there is a match between the obtained authentication data and the authentication data stored in the authentication data storing unit 23. The authentication processing unit 22 notifies the lock control unit 37 of a result of the authentication.

Second Embodiment

Next, a second embodiment of the present invention is described.

In the foregoing first embodiment, a voice communication terminal 3 performs lock control of voice communication of the terminal. Unlike the foregoing embodiment, the media server 1 is adapted to perform lock control in conjunction with each voice communication terminal 3 in the second embodiment.

A multi-party call system of the second embodiment differs from the multi-party call system of the first embodiment shown in FIG. 1 in that a media server 1A and voice communication terminals 3A are provided instead of the media server 1 and the voice communication terminals 3. Other entities are the same as in the first embodiment shown in FIG. 1.

Figure 14:
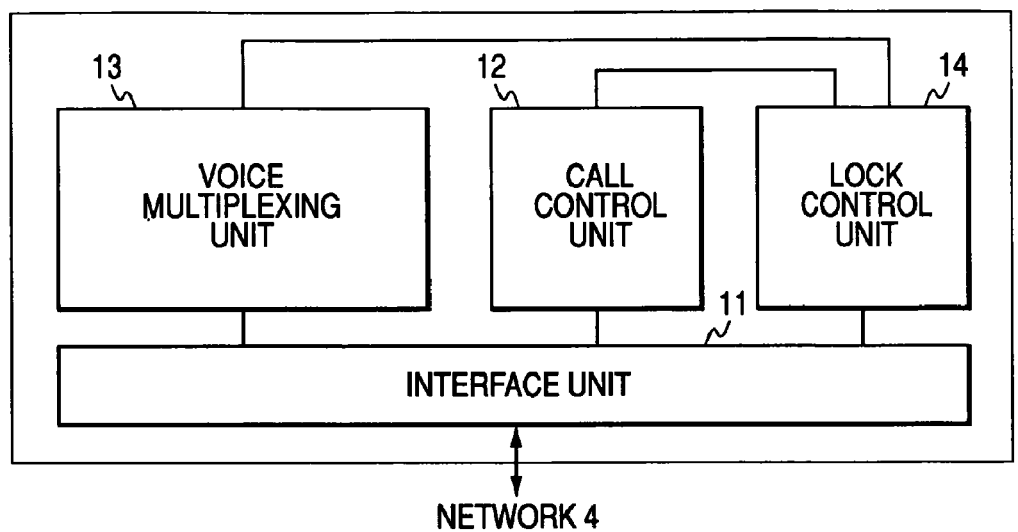
FIG. 14 is a simplified structural diagram of a media server 1A.

The media server 1A conducts multi-party sessions among a plurality of voice communication terminals 3 and performs lock control of each voice communication terminal 3. FIG. 14 is a simplified structural diagram of the media server 1A. As shown, the media server 1A differs from the media server 1 in the first embodiment shown in FIG. 2 in that a lock control unit 14 is added. Other configuration is the same as for the media server 1 in the first embodiment.

According to a lock instruction and an unlock instruction received from a voice communication terminal 3 through the interface unit 11, the lock control unit 14 performs lock control of voice communication with the voice communication terminal 3.

Figure 15:
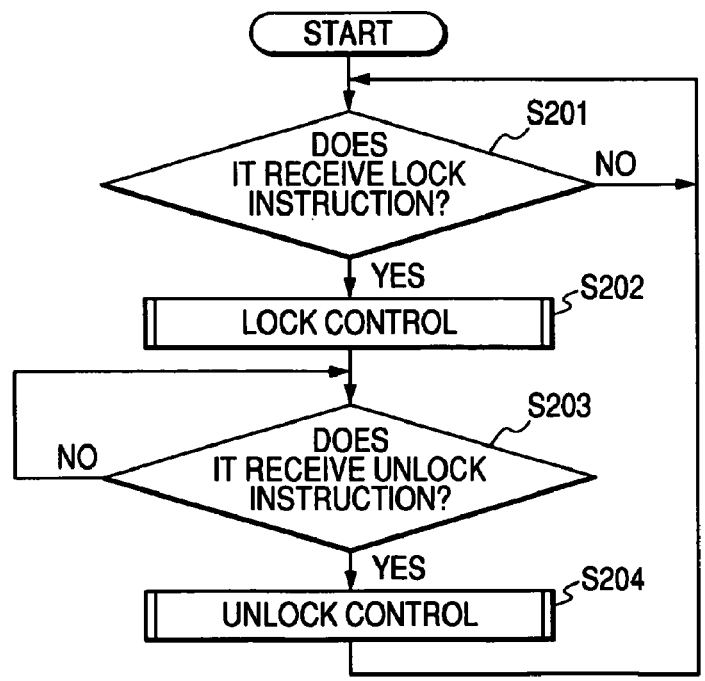
FIG. 15 is a flowchart to explain an operation flow of a lock control unit 14.

FIG. 15 is a flowchart to explain an operation flow of the lock control unit 14 of the media server 1A. This flow takes place for each voice communication terminal for which a call path between the terminal and the media server 1 has been established by the call control unit 12.

First, when receiving a lock instruction from a voice communication terminal 3 through the interface unit 11 (YES at S201), the lock control unit 14 performs lock control (S202) which will be described later. Then, when receiving an unlock instruction from the voice communication terminal 3 through the interface unit 11 (YES at S203), the lock control unit 14 performs unlock control (S204) which will be described later, and returns to the step S201.

FIG. 16 illustrates an operation flow of the lock control (S202) included in the flowchart shown in FIG. 15.

First, the lock control unit 14 instructs the voice multiplexing unit 13 to stop generating multi-party conversation data to be delivered to the voice communication terminal 3 to be acted upon by lock control (S2021). In response, the voice multiplexing unit 13 stops generating multi-party conversation data to be delivered to that voice communication terminal 3. In consequence, the media server 1 stops the transmission of voice packets addressed to that voice communication terminal 3.

Next, the lock control unit 14 instructs the voice multiplexing unit 13 to replace conversation data from voice packets received from that voice communication terminal 3 by a predetermined absence message and add that message in multiplexing (S2022). In response, the voice multiplexing unit 13 combines a pre-registered absence message, replacing the conversation data from the voice packets received from that voice communication terminal 3, with respective conversation data from the voice packets received from other voice communication terminals 3, thus generating multi-party conversation data. In consequence, at each of the voice communication terminals 3 other than the voice communication terminal 3 to be acted upon, the absence message indicating that the user of that voice communication terminal 3 is absent is reproduced.

Next, the lock control unit 14 instructs the voice multiplexing unit 13 to replace conversation data from voice packets received from that voice communication terminal 3 by silence data and add the silence data in multiplexing (S2023). In response, the voice multiplexing unit 13 combines pre-registered silence data, replacing the conversation data from the voice packets received from that voice communication terminal 3 with respective conversation data from the voice packets received from other voice communication terminals 3, thus generating multi-party conversation data. In consequence, at each of the voice communication terminals 3 other than the voice communication terminal 3 to be acted upon, the voice of the user of that voice communication terminal 3 is not reproduced.

Alternatively, the flow diagram shown in FIG. 6 may be modified such that the lock control unit 14 instructs the call control unit 12 to remove the call path established between the media server 1 and the voice communication terminal 3 to be acted upon by lock control.

FIG. 17 illustrates an operation flow of the unlock control (S204) included in the flowchart shown in FIG. 15.

First, the lock control unit 14 instructs the voice multiplexing unit 13 to restart generating multi-party conversation data to be delivered to the voice communication terminal 3 to be acted upon by unlock control (S2041). In response, the voice multiplexing unit 13 restarts generating multi-party conversation data to be delivered to that voice communication terminal 3. In consequence, the media server 1 restarts the transmission of voice packets addressed to that voice communication terminal 3.

Next, the lock control unit 14 instructs the voice multiplexing unit 13 to add conversation data from voice packets received from that voice communication terminal 3, replacing the silence data, in multiplexing (S2042). In response, the voice multiplexing unit 13 combines conversation data from the voice packets received from that voice communication terminal 3, replacing the silence data, with respective conversation data from the voice packets received from other voice communication terminals 3, thus generating multi-party conversation data. In consequence, at each of the voice communication terminals 3 other than the voice communication terminal 3 to be acted upon, the voice of the user of that voice communication terminal 3 is reproduced.

A voice communication terminal 5A is the same as a voice communication terminal 5 in the first embodiment, except that the lock control unit 37 operates differently.

Figure 18:
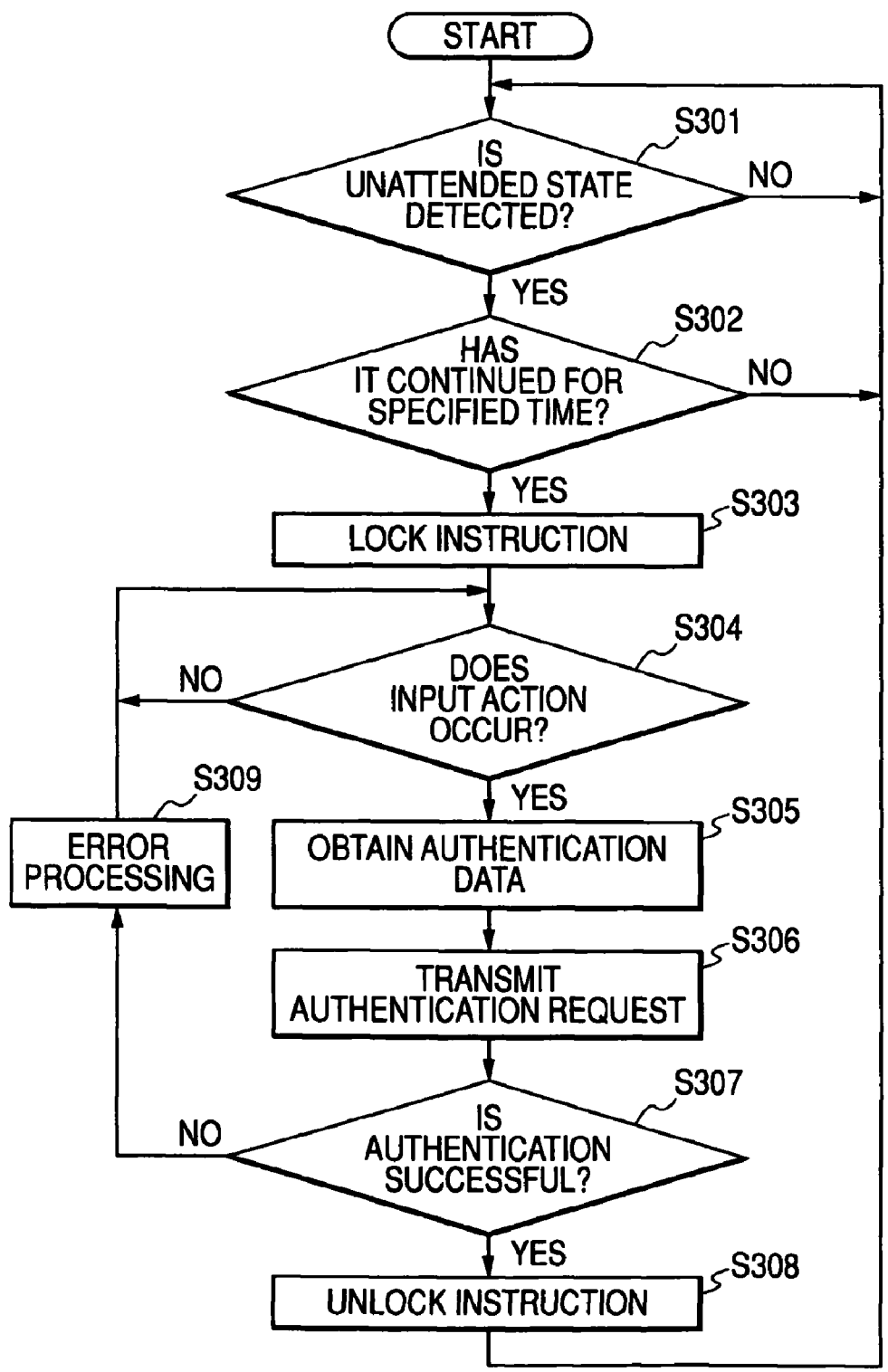
FIG. 18 is a flowchart to explain an operation flow of the lock control unit 37.

FIG. 18 is a flowchart to explain an operation flow of the lock control unit 37 of a voice communication terminal 3. After a call path is established between the terminal and the media server 1 by the call control unit 32, when the conversation processing unit 33 transmits and receives voice packets through this call path, this flow takes place.

First, when an unattended state of the voice communication terminal 3 is detected by the unattended state detecting unit 38 (YES at S301), the lock control unit 37 waits until the unattended state has continued for a given time period (e.g., one minute) (S302). If the unattended state has continued for the given time period (YES at S302), the lock control unit 37 generates a lock instruction with the ID of the terminal and transmits this instruction to the media server 1 through the interface unit 31 (S303).

Then, when any input action by the user via the GUI unit 39 occurs (YES at S304), the lock control unit 37 has an input prompt screen for authentication data displayed on the GUI unit 39 and obtains authentication data entered by the user (S305). Then, the lock control unit 37 generates an authentication request including the obtained authentication data and the ID of the terminal and transmits the authentication request to the authentication server 2 through the interface unit 31 (S306). The lock control unit 37 awaits a return of an authentication result from the authentication server 2.

If the authentication result received from the authentication server 2 is successful (YES at S307), the lock control unit 37 generates a unlock instruction with the ID of the terminal and transmits this instruction to the media server 1 through the interface unit 31 (S308). Then, the lock control unit 37 returns to the step S301. Otherwise, if the authentication result received from the authentication server 2 is unsuccessful (NO at S307), the lock control unit 37 performs predetermined error processing (S309) such as presenting an error message to the user via the GUI unit 39, and returns to S304.

Next, how the multi-party call system configured as noted above operates is described with reference to FIG. 19. FIG. 13 illustrates an example of the multi-party call system operation in a case where, during a multi-party conversation being performed among three voice communication terminals A to C, the user of a voice communication terminal A leaves his or her seat and returns after a while.

At each of the voice communication terminals A to C, after the user's voice is picked up by the mike 362 and encoded into conversation data by the voice recording unit 35, the conversation data is put into voice packets by the conversation processing unit 33 and these packets are transmitted through the interface unit 31 to the media server 1 (T201 to T203).

At the media server 1, the voice packets transmitted from the voice communication terminals A to C are received through the interface unit 11 and passed to the voice multiplexing unit 13. The voice multiplexing unit 13 generates multi-party conversation data to be delivered to each of the voice communication terminals A to C from the conversation data contained in the voice packets transmitted from the voice communication terminals A to C (T204). Then, the voice multiplexing unit 13 puts the multi-party conversation data to be delivered to each of the voice communication terminals A to C into voice packets and transmits these packets through the interface unit 11 to the voice communication terminals A to C, respectively (T205 to T207).

At the voice communication terminal A, the voice reproducing unit 34 decodes the multi-party conversation data received from the media server 1 via the interface unit 31 and the conversation processing unit 33 into analog voice reproduction signals and outputs the voice reproduction signals from the speaker 361. The same processing is performed at the voice communication terminals B and C as well.

At the voice communication terminal A, when an unattended state is detected by the unattended state detecting unit 38 (T211), the lock control unit 37 waits until the unattended state has continued for a given time period t and transmits a lock instruction to the media server 1 (T212).

Voice packets containing conversation data are transmitted from each of the voice communication terminals A to C to the media server 1 (T221 to T223), as are done in T201 to T203. However, the lock control unit 14 of the media server 1 controls the voice multiplexing unit 13 upon receiving the lock instruction from the voice communication terminal A. By this control, the voice multiplexing unit 13 stops generating multi-party conversation data (into which respective conversation data from the voice communication terminals B and C is combined) to be delivered to the voice communication terminal A. Besides, the voice multiplexing unit 13 first applies an absence message and then applies silence data as replacement of conversation data from the voice communication terminal A to be put into multiple-party conversation data to be delivered to each of the voice communication terminals B and C (T224).

As a result, the media server 1 does not transmit voice packets containing multi-party conversation data to the voice communication terminal A. On the other hand, the media server 1 transmits to the voice communication terminal B voice packets containing multi-party conversation data generated by combining the absence message of the voice communication terminal A and conversation data from the voice communication terminal C and then voice packets containing multi-party conversation data generated by combining conversation data from the voice communication terminal C and silence data (T225). Likewise, the media server 1 transmits to the voice communication terminal C voice packets containing multi-party conversation data generated by combining the absence message of the voice communication terminal A and conversation data from the voice communication terminal B and then voice packets containing multi-party conversation data generated by combining conversation data from the voice communication terminal B and silence data (T226).

Then, at the voice communication terminal A, after the GUI unit 39 accepts any user input action (T231), the lock control unit 37 obtains authentication data entered by the user via the GUI unit 39 (T232). The lock control unit 37 generates and transmits an authentication request including the obtained authentication data to the authentication server 2 (T233).

At the authentication server 2, when receiving the authentication request from the voice communication terminal A through the interface unit 21, the authentication processing unit 22 performs authentication processing for the authentication request (T234). The authentication server 2 transmits a result of the authentication to the voice communication terminal A (T235).

At the voice communication terminal A, the lock control unit 37 receives the authentication result from the authentication server 2. If the authentication result is successful, the lock control unit 37 generates and transmits an unlock instruction to the media server 1. Upon receiving the unlock instruction, the lock control unit 14 of the media server 1 controls the voice multiplexing unit 13. By this control, the voice multiplexing unit 13 restarts generating multi-party conversation data to be delivered to the voice communication terminal A. Besides, the voice multiplexing unit 13 takes conversation data from the voice communication terminal A again, not the silence data, as the data to be put into multi-party conversation data to be delivered to each of the voice communication terminals B and C. As a result, the state of a sequence of T201 to T207 is recovered. Otherwise, if the authentication result is unsuccessful, an unlock instruction is not transmitted to the media server 1. In consequence, the state of a sequence of T221 to T226 continues (T236).

At T224, the lock control unit 14 of the media server 1 may instruct the call control unit 12 to remove the call path between the media server and the voice communication terminal A, instead of stopping the generation of multi-party conversation data to be delivered to the voice communication terminal A and replacing the conversation data from the voice communication terminal A by suitable data to be put into multi-party conversation data to be delivered to each of the voice communication terminals B and C. In this case, at T236, the lock control unit 14 of the media server 1 instructs the call control unit 12 to reestablish a call path between the media server and the voice communication terminal A, if the authentication result returned from the authentication server 2 is successful.

The second embodiment of the present invention has been described above.

According to the second embodiment, it is possible to prevent an event where the voice communication terminal 3 is locked in the middle of voice communication, as is the case for the foregoing first embodiment. In the second embodiment as well, the voice communication terminal that has obtained authentication data entered may perform authentication for unlock by itself, as noted for the foregoing first embodiment.

The present invention is not limited to the foregoing embodiments and various modifications are possible without departing from the scope of the invention.

For instance, although the foregoing first embodiment has been discussed, assuming that a multi-party call system is realized, using the media server 1, the present invention is not so limited. Alternatively, a multi-party call system can be realized without using the media server 1, for example, in such a manner that the call control unit 32 of a voice communication terminal establishes individual call paths to other parties (other voice communication terminals 3) in multi-party conversation. The conversation processing unit 33 transmits voice packets containing conversation data supplied from the voice recording unit 35 to each of the other parities in multi-party conversation through the call paths established with each of the other parties. Besides, the conversation processing unit 33 combines voice data contained in voice packets transmitted from each of the other parities in multi-party conversation through the call paths established with each of the other parties and outputs the thus multiplexed voice data to the voice reproducing unit 34. In this case, lock/unlock control can be performed in the same manner as described for the foregoing first embodiment. However, if lock control involves call path removal, the call control unit has to remove all the call paths established with the other parities in multi-party conversation. For unlock control, the call control unit reestablishes individual call paths with other parities in multiple-party conversation.

In the foregoing first embodiment, for a voice communication terminal, if its unattended state has continued for a given time period, incoming calls may be forwarded to another voice communication terminal registered in advance. For example, when the unattended state has continued for a given time period, the lock control unit 37 instructs the call control unit 32 to establish a call path to another voice communication terminal (e.g., a mobile terminal) which has been registered beforehand. Then, the interface unit 31 is controlled to connect the call path established with the media server 1 to the call path established with another voice communication terminal registered beforehand. Thereby, multi-party conversation data transmitted from the media server 1 is forwarded to another voice communication terminal and conversation data transmitted from that another terminal is forwarded to the media server.

In the above embodiments, the authentication data may be biologic information (e.g., fingerprint data and iris data). A voice communication terminal 3 may be equipped with a unit that captures biologic information such as a fingerprint reader or an iris capturing device and authentication data may be acquired from the user by using the unit.

While the above embodiments have been discussed, taking the multi-party call system as an example, the present invention can be applied to a peer-to-peer voice communication system in a similar way.

In the described embodiments, the media server 1 implemented on a single computer system including the media gateway function and the media gateway controller (management server) function of the media server 1 is used as an example. However, the present invention is not so limited. The media gateway and the media gateway controller may be implemented independently on separate-computer systems. For example, in the above second embodiment, the media gateway controller including the interface unit 11, the call control unit 12, and the lock control unit 14 and the media gateway including the voice multiplexing unit 13 may be implemented independently on separate computer systems and the media server 1 may be built by connecting both by, for example, a local network.

What is claimed is:

1. A voice communication terminal comprising:
   a sensor unit that detects an unattended state of the voice communication terminal corresponding to a time at which a user of the voice communication terminal leaves the terminal;
   a determining unit that determines whether the unattended state detected by said sensor unit has continued for a given time period or longer; and
   a lock control unit that locks communication functions of the terminal including a first function so that voice input to the terminal will not be transmitted to other parties in conversation and a second function so that voice of any other party will not be output from the terminal, if the unattended state has continued for the given time period or longer, as determined by said sensor unit, wherein said lock control unit includes a first controller that controls stopping and restarting the recording of voice input to the terminal, and a second controller that controls stopping and restarting the reproducing of voice received from other parties in conversation.

2. The voice communication terminal according to claim 1, further comprising a user interface unit that accepts user input action;
   wherein, when said user interface unit accepts a user input action during a locked state in which the communication functions are locked so that voice input to the terminal will not be transmitted to other parties in conversation and voice of any other party will not be output from the terminal, said lock control unit obtains authentication data entered by the user, and unlocks said locked state, if authentication based on the authentication data is successful.

3. The voice communication terminal according to claim 1, wherein:
   said lock control unit includes:
   a third controller that controls removing and reestablishing a call path established with any other party in conversation.

4. The voice communication terminal according to claim 1, wherein:
   said sensor unit is a wearing sensor attached to a headset which is used for conversation with other parties in conversation.

5. The voice communication terminal according to claim 1, wherein:
   said sensor unit is a seating sensor attached to a chair which is used for operating said voice communication terminal.

6. The voice communication terminal according to claim 1, wherein:
   said sensor unit is an infrared sensor located in the front of said voice communication terminal.

7. A media server which implements multi-party sessions among a plurality of voice communication terminals, comprising:
- a voice multiplexing unit that generates multi-party conversation data for each voice communication terminal by combining respective conversation data received from voice communication terminals other than said each voice communication terminal into multi-party conversation data to be delivered to said each voice communication terminal and transmits the multi-party conversation data to said each voice communication terminal; and
- a lock control unit that, according to a lock instruction issued from a voice communication terminal, locks communication functions at least one of to and from the voice communication terminal including a first function so that conversation data received from the voice communication terminal will not be included in multi-party conversation data to be delivered to other voice communication terminals and a second function so that multi-party conversation data addressed to the voice communication terminal will not be transmitted to the voice communication terminal, wherein said lock control unit includes a first controller that controls stopping and restarting the generation of the multi-party conversation data, and a second controller that controls starting and stopping the replacement of the conversation data by silence data to be combined with other conversation data.

8. The media server according to claim 7, wherein:
said lock control unit unlocks said communication functions in accordance with an unlock instruction from the voice communication terminal.

9. The media server according to claim 7, wherein:
said lock control unit includes:
a third controller that controls removing and reestablishing a call path established with each voice communication terminal.

10. A non-transitory computer-readable storage medium with an executable program stored thereon, wherein the program instructs a microprocessor to implement functions of:
- a voice communication unit that performs voice communication with other parties in conversation;
- a detecting unit that detects, using a sensor, an unattended state of a computer that includes the microprocessor corresponding to a time at which a user of the computer leaves the computer;
- a determining unit that determines whether the unattended state detected by said detecting unit has continued for a given time period or longer; and
- a lock control unit that locks the voice communication including a first function so that voice input to the computer will not be transmitted to other parties in conversation and a second function so that voice of any other party will not be output from the computer, if the unattended state has continued for the given time period or longer, as determined by said determining unit, wherein said lock control unit includes a first controller that controls stopping and restarting the recording of voice input to the terminal, and a second controller that controls stopping and restarting the reproducing of voice received from other parties in conversation.

11. A non-transitory computer-readable storage medium with an executable program stored thereon, wherein the program instructs a microprocessor to implement functions of:
- a voice multiplexing unit that generates multi-party conversation data for every one of the voice communication terminals by combining respective conversation data received from each of voice communication terminals other than the one of the voice communication terminals into multi-party conversation data to be delivered to the one of the voice communication terminals and transmits the multi-party conversation data to the one of the voice communication terminals; and
- a lock control unit that, according to a lock instruction issued from a voice communication terminal, locks communication functions at least one of to and from the voice communication terminal including a first function so that conversation data received from the voice communication terminal will not be included in multi-party conversation data to be delivered to other voice communication terminals and a second function so that multi-party conversation data addressed to the voice communication terminal will not be transmitted to the voice communication terminal, wherein said lock control unit includes a first controller that controls stopping and restarting the generation of the multi-party conversation data, and a second controller that controls starting and stopping the replacement of the conversation data by silence data to be combined with other conversation data.

12. A method for control of locking voice communication, whereby a voice communication terminal locks voice communication with other parties in conversation, said method comprising:
- detecting, using a sensor implemented in the voice communication terminal, an unattended state of the voice communication terminal corresponding to a time at which a user of the terminal leaves the terminal;
- determining whether the unattended state has continued for a given time period or longer; and
- locking communication functions of the terminal including a first function so that voice input to the terminal will not be transmitted to other parties in conversation and a second function so that voice of any other party will not be output from the terminal, upon determining that the unattended state has continued for the given time period or longer, wherein said lock control unit includes a first controller that controls stopping and restarting the recording of voice input to the terminal, and a second controller that controls stopping and restarting the reproducing of voice received from other parties in conversation.

13. A method for control of locking voice communication, whereby a media server locks voice communication to or from any of a plurality of voice communication terminals participating in a multi-party conversation, said method comprising:
- generating multi-party conversation data for each voice communication terminal by combining respective conversation data received from voice communication terminals other than said each voice communication terminal into multi-party conversation data to be delivered to said each voice communication terminal;
- transmitting the multi-party conversation data to said each voice communication terminal; and
- when receiving a lock instruction issued from a voice communication terminal, locking communication functions at least one of to and from the voice communication terminal including a first function so that conversation data received from the voice communication terminal will not be included in multi-party conversation data to be delivered to other voice communication terminals and a second function so that multi-party conversation data addressed to the voice communication terminal will not be transmitted to the voice communication terminal, wherein said lock control unit includes a first controller that controls stopping and restarting the generation of the multi-party conversation data, and a second controller that controls starting and stopping the replacement of the conversation data by silence data to be combined with other conversation data.

* * * * *